United States Patent [19]

Yoshiura et al.

[11] 4,029,877

[45] June 14, 1977

[54] PROCESS FOR PREPARING POLYOLEFIN

[75] Inventors: Hirohisa Yoshiura; Toshiharu Arai; Masao Miyake; Yoshikane Furuya; Seiji Onogi; Tetsushi Kamizono, all of Kurashiki, Japan

[73] Assignee: Mitsubishi Chemical Industries Ltd., Tokyo, Japan

[22] Filed: June 10, 1975

[21] Appl. No.: 585,600

[30] Foreign Application Priority Data

June 13, 1974 Japan ............................ 49-67365

[52] U.S. Cl. ............................ 528/483; 260/23 H; 526/106; 526/116; 528/499
[51] Int. Cl.$^2$ .......................................... C08F 6/00
[58] Field of Search ......... 260/93.7, 88.2 S, 94.9 F, 260/94.9 GC; 450/766, 774; 528/483, 499

[56] References Cited

UNITED STATES PATENTS

| 2,838,477 | 6/1958 | Roelen et al. | 260/82 |
| 2,918,461 | 12/1959 | Flynn | 260/94.9 |
| 3,110,708 | 11/1963 | Wisseroth et al. | 260/93.7 |
| 3,496,156 | 2/1970 | Luciani et al. | 260/93.7 |

Primary Examiner—Stanford M. Levin
Attorney, Agent, or Firm—Oblon, Fisher, Spivak, McClelland & Maier

[57] ABSTRACT

In a process for preparing a polyolefin without separation of catalyst residues by polymerizing an olefin in the pres ence of a Ziegler catalyst having high catalytic activity, in an inert gas sealing system; an improvement comprises separating the polyolefin containing the catalyst residue from the polymerization mixture, and contacting the polyolefin containing the catalyst residue with a weak reactive gas of oxygen and/or steam diluted with an inert gas.

5 Claims, No Drawings

PROCESS FOR PREPARING POLYOLEFIN

BACKGROUND OF THE INVENTION

1. Field Of The Invention

The present invention relates to a process for preparing a polyolefin. More particularly, it relates to an improved process for preparing a polyolefin having improved hue.

2. Description Of The Prior Art

Heretofore, several processes for preparing a polyolefin which use a Ziegler catalyst have been known. These processes can be classified into those using an inert solvent and those using no solvent. The former processes (using an inert solvent) can be further classified into those employing either a solution polymerization system or a slurry polymerization system, depending upon the conditions of polymerization such as temperature, types of inert solvent, concentrations of polyolefin, and the like. The latter processes (using no solvent) can be further classified into those employing vapor phase polymerization, solution polymerization or slurry polymerization of the olefin monomer, depending upon the conditions employed such as temperature and pressure.

After the polymerization of an olefin by any of these processes, the polyolefin products can be obtained by one or more further treatment steps. After a solution polymerization using an inert solvent, these subsequent steps include interruption of polymerization, separation of the unreacted olefin, separation of catalyst residues, precipitation of solid polyolefin, separation of solvent and drying. After a slurry polymerization using an inert solvent, these steps include interruption of polymerization, separation of unreacted olefin, separation of catalyst residues, separation of solvent and drying. After a vapor phase polymerization using no solvent, the steps include interruption of polymerization, separation of unreacted olefin, and separation of catalyst residues. After a solution polymerization or a slurry polymerization using no inert solvent, these steps include interruption of polymerization precipitation of solid polyolefin, separation of unreacted olefin, separation of catalyst residues and drying. In these treatments, if necessary, other steps such as pelletization can be added or the order of the steps can be changed. From an industrial viewpoint, it is preferred to eliminate certain steps and to combine others. For example, when the polymerization is conducted by using a catalyst having high catalytic activity, the amount of the catalyst residue is so small that the separation of catalyst residues can be eliminated. This results in a very significant industrial advantage. However, conventional polyolefins prepared by using a Ziegler catalyst, especially those prepared without a separation of catalyst residue, possess inferior hue and thermal stability. The inferior hue may be caused by the mutual action of the halogen and the metal compound of the catalyst residue on the polyolefin product or by the mutual action of the catalyst residue and other additives such as a stabilizer.

Consequently, in processes for preparing polyolefins, especially those polymerized in the presence of a Ziegler catalyst having high catalytic activity, there is a great need for improvement of the hue of the products prepared without separation of the catalyst residue.

SUMMARY OF THE INVENTION

Accordingly, it is an object of the present invention to provide a process for preparing a polyolefin having improved hue in a simple operation without separation of the catalyst residue.

Briefly, these and other objects of this invention, as will hereinafter become clear by the ensuing discussion, have been attained by providing a process for preparing a polyolefin, without separation of the catalyst residue by polymerizing an olefin in the presence of a Ziegler catalyst having high catalytic activity in an inert gas sealing system, which comprises separating the polyolefin containing only the catalyst residues from the polymerization mixture, and contacting it for a short time with a weak reactive gas of oxygen and/or steam diluted with an inert gas.

DETAILED DESCRIPTION OF THE PREFERRED EMBODIMENTS

The Ziegler catalysts used in the invention are combinations of transition metal compounds of Groups IV – VIII of the Periodic Table and organo-metallic compounds of Groups I – III of the Periodic Table which are used for polymerizing an olefin. A typical Ziegler catalyst is a combination of titanium tetrachloride and an alkylaluminum compound. Suitable Ziegler catalysts include those supporting a transition metal compound such as titanium tetrachloride or chromium oxide on a carrier such as magnesium chloride or silica, those combining an organo-metallic compound with a transition metal compound in a lower valence state or other conventional modified Ziegler catalysts. When titanium and/or vanadium is selected as the transition metal of the Ziegler catalysts, an especially significant effect of the invention is attained. In the polymerization of an olefin using a Ziegler catalyst, it is preferred to use a Ziegler catalyst having high catalytic activity so as to eliminate the step of separation of catalyst residues. It is especially preferred to select a catalyst and polymerization conditions so as to produce more than 10,000 g of polyolefin per 1 g of transition metal compound, or 2,000 g of a polyolefin per 1 g of catalyst comprising a transition metal compound supported on a carrier.

Suitable polyolefins for production by this invention include polyethylene, polypropylene, polybutene-1, poly-4-methylpentene-1, and copolymers of olefins such as ethylene-propylene copolymers and the like. It is especially applicable for production of polyethylene, polypropylene, ethylene-propylene copolymer and ethylene-butene copolymer.

In this invention, the term "separation of catalyst residues" refers to the step of removing catalyst residues from a solution of polyolefin prepared by polymerizing an olefin, by means of mechanical separation such as filtration and to the step of separation of catalyst residues by treating the solution of polyolefin with a large amount of a liquid, e.g., water, alcohol, and the like, optionally containing a mineral acid, to transfer most of the catalyst residue from the solution or slurry of polyolefin to the water or alcohol phase. In this invention, polyolefins containing only catalyst residues can be obtained from the polymerization mixture without need for the step of separation of catalyst residues using suitable operations depending upon the polymerization system, such as interruption of polymerization, separation of unreacted monomer, precipitation of polyolefin, separation of solvent, and drying.

Interruption of polymerization can be effected by adding to the Ziegler catalyst a small amount of a catalyst poison such as an ether, an alcohol, a ketone, an ester, water and the like. When this is done, it is possible for the catalyst poison to be incorporated in the polyolefin product together with the catalyst residue. Accordingly, it is preferred to select a catalyst poison which poses no problem when present in the product or which can be easily removed by subsequent treatment. Separation of unreacted monomer can be conducted in accordance with any conventional manner for gas-liquid separation. It is not usually preferred to contact a polyolefin product containing unreacted monomer with oxygen and/or water because this results in difficulties when the unreacted monomer is recycled in the polymerization step. The steps of precipitation of polyolefin and separation of solvent are not always necessary in certain polymerization systems. The precipitation of polyolefin is indispensable for a solution polymerization system; while separation of solvent is indispensable for a polymerization system using an inert solvent. Conventional techniques may be employed in these steps.

In brief, the polyolefins which are contacted with the weak reactive gas of oxygen and/or steam in accordance with this invention, should preferably be powdery, granular (diameter of about 10 – 1000 μm) or molten and should be separated from most of the starting materials, the additives (e.g., hydrogen) and the inert solvents from the polymerization reaction using the above-mentioned steps. Only the catalyst residues should remain. When the polyolefin is contacted with low concentration of oxygen, it is preferred to dilute the oxygen with an inert gas in the range of 0.05 – 0.5 mole %, preferably 0.1 – 0.3 mole %. When the oxygen concentration is higher than 0.5 mole %, significant thermal and oxidizing deterioration of the polyolefins occurs, forming spots. In particular cases, undesirable coloring of the polyolefin product is caused by the oxidation. When the oxygen concentration is lower than 0.05 mole %, improvement of the hue of the polyolefin product becomes unlikely. When contacting the polyolefin with a low concentration of steam, it is preferred to dilute the water with an inert gas in the range of 0.05 – 1 mole %, preferably 0.1– 0.5 mole %. When the steam concentration is lower than 0.05 mole %, improvement of the hue of the polyolefin product becomes unlikely. When the steam concentration is higher than 1 mole %, there is no adverse effect on the polyolefin product. However, continuous stable operation of the reactor becomes difficult. The object of the invention may be attained even though the concentration of oxygen and/or steam diluted with the inert gas is lower than said range if the time of contact with the polyolefin is prolonged or if the temperature is high. However, these conditions represent significant drawbacks in an industrial operation.

The inert gas used for diluting oxygen and/or water can be any inert gas used for the conventional polymerization of olefins in the presence of a Ziegler catalyst. Suitable inert gases include nitrogen, argon and the like. The temperature of the polyolefin, and the temperature of the oxygen and/or steam in contact with it is not critical. It is usually in the range of 40° – 110° C, especially 60° – 100° C in the case of powdery or granular polyolefin, and in the range of 150° – 300° C, especially 170° – 270° C in the case of molten polyolefin. At lower temperatures, the time of contact required to achieve the same results is prolonged, resulting in a signficant disadvantage for an industrial operation. At higher temperatures, adverse effects such as deterioration of the hue and other physical properties of the polyolefin products by thermal and oxidizing degradation become pronounced. Accordingly, careful control using a short contact time is required. In the contacting of the polyolefin with the weak reactive gas of oxygen and/or steam, the object of the invention can be easily attained by using a powdery or granular polyolefin because of the large contact area involved. Inert gases used for sealing in a conventional process such as pelletization can be used in this invention instead of oxygen or steam diluted with an inert gas. This is one of the preferred embodiments because it is a simple step. When a molten polyolefin is used, it is preferred to contact the weak reactive gas of oxygen and/or water with a polyolefin extruded by a pelletizer in a semi-molten form. It is possible to directly inject the weak reactive gas of oxygen and/or steam diluted with an inert gas into the molten polyolefin in a contact vessel. However, it is not preferred in industrial operation because of the additional step involved. The time required for contacting the polyolefin with the weak reactive gas depends upon the concentration of oxygen and steam in the inert gas and the temperature of contact. It is usually in the range of 0.1 – 60 minutes.

It is preferred to select the contact conditions in accordance with the activity of the catalyst used for the polymerization. When the amount of catalyst residues in the polyolefin is relatively large, the contact conditions may be severe. It is also preferred to select the contact conditions depending upon the form of the polyolefin. When a molten polyethylene, especially a semi-molten polyethylene, is used, the time for contacting is preferably shorter than that used for a powdery polyolefin. This is true because the temperature for the molten polyolefin is higher than that of the powdery polyolefin and thermal degradation of the polyolefin can occur. The step of contacting with the weak reactive gas of oxygen and/or water diluted with an inert gas is preferably conducted during some other step. For example, in a two-step pelletizer, it can be performed between the first and second steps and in the drying step. This makes for a simple operation. However, the step can be separately conducted. In the process for preparing the polyolefin of this invention, all steps except for the contacting of the weak reactive gas with the polyolefin are preferably conducted in an inert gas atmosphere. The high activity Ziegler catalysts easily lose their activity when contacted with a weak reactive gas. Accordingly, the polymerization step should be conducted in an inert gas atmosphere. It is preferred to exclude oxygen or water from the inert gas although an ineffectual amount of oxygen or water can be present in the polymerization step.

In the past, the oxidizing degradation of polyolefins has been accelerated by contacting polyolefin containing catalyst residues with a gas containing several percent of oxygen in an inert gas, especially at high temperature. Such degradations include the formation of a gel, the formation of spots and undesirable coloring caused by carbonyl groups formed in the polyolefin. However, in accordance with the process of this invention of contacting the polyolefin with the weak reactive gas, a remarkable industrial advantage occurs wherein the hue of the pellets of the polyolefin product containing catalyst residues is improved to the level of the pellets of the polyolefin product containing no catalyst residues prepared by the step of separation of catalyst residues. This improvement of hue is not expected by normal treatment after pelletization. Conventionally, in order to improve the hue of a polyolefin containing catalyst residues, it has been proposed to add certain additives. Advantageously, when the hue of the polyolefin is improved in accordance with the process of this invention, the amount of said additive may be decreased. The polyolefins prepared in accordance with the process of this invention can be admixed with conventional additives such as a stabilizer, a weather durability improver, a flame-proofing agent, a parting agent, a heat stabilizer, an antistatic agent, a coloring agent of a dye and a pigment, a plasticizer, a reinforcing agent, a surfactant, an inorganic filler, a lubricant, a cross-linking agent, and the like. It is customary to add a stabilizer to the polyolefin. Suitable stabilizers include: phenol type antioxidants, organic phosphorous esters, dithiopropionic acid type antioxidants, metal soaps, nonionic surfactants, salicylate type ultraviolet absorbers, benzophenone type ultraviolet absorbers, benzotriazol type ultraviolet absorbers, piperidine type ultraviolet absorbers, imidazoline type ultraviolet absorbers, and the like.

Also advantageously, in accordance with this invention, it is unnecessary to employ special equipment since the process is not complicated. Additionally, when a molten polyolefin is used, the improvement of the hue is attained in a short time. On the other hand, when a powdery or granular polyolefin is used, the required contacting time is longer than that for the molten polyolefin at the same concentration of oxygen or steam, but partial thermal degradation of the polyolefin does not occur.

Having generally described the invention, a further understanding can be obtained by reference to certain specific examples which are provided herein for purposes of illustration only and are not intended to be limiting unless otherwise specified. In the examples, Hunter whiteness is measured by the Color and Color Difference Meter (ND-K-5 type manufactured by Nippon Denshoku Kogyo K.K.) using disc shape samples prepared by extruding polyolefin pellets from a small injection type extruder.

EXAMPLE 1

Ethylene was polymerized in a slurry polymerization system by using n-hexane as an inert diluent and the catalyst of AA titanium trichloride (TiCl$_3$· 1/3 AlCl$_3$) and triethylaluminum at 90° C under the total pressure of 52 Kg/cm$^2$ in the presence of hydrogen. The resulting polyethylene was separated from the inert diluent and the solid polyethylene was dried in a nitrogen atmosphere. It was melted and extruded to pelletize it. The Hunter whiteness of the product is shown in Experiment 1 in Table 1. In said process, polyethylene was produced at a rate of 45,000 g per 1 g of TiCl$_3$·1/3 AlCl$_3$. After drying, and before melting, the powdery polyethylene was stirred at 80° C for 2 minutes in nitrogen gas containing the low concentration of oxygen shown in Table 1, prepared by diluting air with nitrogen gas. The treated powdery polyethylene was melted and extruded to pelletize it. The hues of the products prepared from the pellets (Hunter whiteness W, b) are shown in Table 1.

TABLE 1

| Experiment | Concentration of oxygen(mole %) | Hunter whiteness W | b |
|---|---|---|---|
| 1 | 0.03* | 79.1 | 2.3 |
| 2 | 0.10 | 79.5 | 1.9 |
| 3 | 0.16 | 79.7 | 1.7 |

*oxygen concentration of nitrogen gas used.

EXAMPLE 2

In the process of Example 1, after drying the powdery polyethylene and before melting it, the powdery polyethylene kept at 85° C was stirred for 3 minutes in nitrogen gas containing 0.10 mole % of steam, as shown in Table 2, prepared by diluting steam with nitrogen gas. The treated powdery polyethylene was melted and extruded to pelletize it. The Hunter whiteness of the product treated without using steam is also shown in Table 2 as Reference 1.

TABLE 2

| | Concentration of water (mole %) | Hunter Whiteness W | b |
|---|---|---|---|
| Reference 1 | <0.001 | 78.8 | 2.7 |
| Example 2 | 0.10 | 79.6 | 1.8 |

EXAMPLE 3

A mixture of titanium tetrachloride and tri-n-butoxyvanadyl in iso-octane was stirred at 95° C for 2 hours in an argon atmosphere. After cooling the mixture, ethylaluminum sesquichloride was added to it and the mixture was stirred for 3 hours to prepare a precipitate which was insoluble in iso-octane. The precipitate was washed with n-hexane to prepare the first catalytic component. The catalyst was prepared by combining this first catalytic component and tri-isobutylaluminum. In accordance with the process of Example 1, ethylene was polymerized by using said catalyst under a total pressure of 30 atm. The resulting powdery polyethylene was contacted with 0.15 mole % of oxygen diluted with nitrogen gas, to prepare the treated polyethylene pellets. As a reference (Reference 2 of Table 3), the process was repeated in a nitrogen atmosphere without air from the polymerization to the pelletization. In these polymerizations, 40,000 g of polyethylene per 1 g of the catalyst was produced. The Hunter whitenesses of the products prepared from the pellets are shown in Table 3.

TABLE 3

| | Concentration of oxygen (mole %) | Hunter whiteness W | b |
|---|---|---|---|
| Example 2 | 0.15 | 75.9 | 2.7 |
| Reference 2 | <0.03 | 75.3 | 4.2 |

EXAMPLE 4

In the process of Example 3, a two step pelletizer was used. After melting the resulting polyethylene in the first step and before feeding into the second step, the polyethylene kept at 170° C was stirred for 1 minute in nitrogen gas containing 0.25 mole % of oxygen prepared by diluting air with nitrogen gas. The treated polyethylene was extruded in a nitrogen atmosphere to pelletize it. As a reference (Reference 3 of Table 4), the process was repeated in a nitrogen atmosphere without air from the polymerization to the pelletization. The Hunter whitenesses of the products prepared from the pellets are shown in Table 4.

TABLE 4

| | Concentration of oxygen (mole %) | Hunter whiteness W | b |
|---|---|---|---|
| Example 4 | 0.25 | 75.9 | 3.4 |
| Reference 3 | <0.05 | 75.4 | 4.4 |

EXAMPLE 5

An aqueous solution of chromium oxide was impreganted into silica and the latter was dried at 120° C and activated at 800° C to obtain a silica-chromium oxide catalyst containing 1 wt. % of chromium. Ethylene was polymerized at 80° C under a total pressure of 2 kg/cm² in hexane by using this silica-chromium oxide catalyst. The resulting product was washed with hexane to obtain a catalyst-polyethylene mixture having 5 g of polyethylene per 1 g of the silica-chromium oxide catalyst. Ethylene was continuously polymerized at 90° C under the total pressure of 13 kg/cm² by using the catalyst-polyethylene mixture and triethylaluminum. In said process, polyethylene was produced at a rate of 3,000 g per 1 g of the silica-chromium oxide catalyst. After drying the powdery polyethylene and before melting it, the powdery polyethylene kept at 80° C was stirred for 30 minutes in nitrogen gas containing the low concentration of oxygen shown in Table 5, prepared by diluting air with nitrogen gas. The polyethylene was admixed with 0.03 wt. % of 4,4'-thio-bis-(6-tert-butyl-3-methyl phenol), 0.05 wt. % of tris (mixed mono and di-nonylphenyl) phosphite, 0.03 wt. % of polyethyleneglycol-oleyl ether, 0.03 wt. % of calcium stearate, 0.02 wt. % of 4-benzoyloxy-2,2,6,6-tetramethyl piperazine and 0.02 wt. % of 2-(2'-hydroxy-3',5'-di-tert-butyl-phenol)-5-chlorobenzotriazole. The treated powdery polyethylene was melted and extruded to pelletize it at 250° C. The hues of the products prepared from the pellets (Hunter whiteness W, b) are shown in Table 5.

TABLE 5

| Run | Concentration of oxygen (mole %) | Hunter whiteness W | b |
|---|---|---|---|
| 1 | 0.03 | — | 14 |
| 2 | 0.4 | 76.7 | 6.5 |
| 3 | 20 | 75.8 | 9.0 |

EXAMPLE 6

The preparation of polyethylene was repeated in accordance with the process of Example 4, except for changing the concentration of oxygen to 0.15 mole %. As a reference (Reference 4 of Table 6), the process was repeated except for changing the concentration of oxygen to 0.65 mole %. The Hunter whitenesses of the products prepared from the pellets are shown in Table 6.

TABLE 6

| | Concentration of oxygen (mole %) | Hunter whiteness b |
|---|---|---|
| Example 5 | 0.15 | 2.6 |
| Reference 4 | 0.65 | 3.7 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In a process for preparing a polyolefin by polymerizing an olefin in the presence of a Ziegler catalyst having high catalytic activity, in an inert gas sealing system, the improvement which consists essentially of:
   separating the polyolefin containing the catalyst residue from the polymerization mixture; and
   contacting the polyolefin containing the catalyst residue with a weakly reactive gas of a mixture of an inert gas and a component selected from the group consisting of oxygen, water vapor and mixtures thereof, wherein the concentration of oxygen and water vapor in the inert gas ranges from 0.05 to 0.5 mole percent and 0.05 to 1 mole percent respectively, without separation of catalyst residues from said polyolefin.

2. The process of claim 1, wherein a powdery or granular polyolefin is contacted with said weakly reactive gas at a temperature from 40° C to 110° C.

3. The process of claim 1, wherein a molten or semi-molten polyolefin is contacted with said weakly reactive gas at 150°–300° C.

4. The process of claim 1, wherein the polyolefin is contacted with the weakly reactive gas before the polyolefin is melted.

5. The process of claim 1, wherein the polyolefin is contacted with the weakly reactive gas in a two step pelletizing operation, or in a drying operation.

* * * * *